UNITED STATES PATENT OFFICE.

OSCAR GÜNTHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BLUISH-RED AZO DYE.

1,009,740.  Specification of Letters Patent.  Patented Nov. 28, 1911.

No Drawing.  Application filed July 18, 1911.  Serial No. 639,124.

*To all whom it may concern:*

Be it known that I, OSCAR GÜNTHER, doctor of philosophy, chemist, citizen of the German Empire, residing at Elberfeld, Germany, have invented new and useful Improvements in Bluish-Red Azo Dye, of which the following is a specification.

My invention relates to the manufacture and production of new azo dyes which dye cotton from red to violet-red shades fast to light. The process for their production consists in combining the tetrazo compound of para-para'-diaminodiphenylurea-meta-meta'-disulfonic acid:

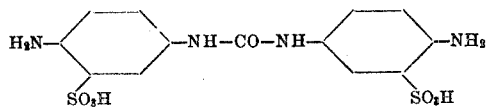

in acid or neutral solution with one molecule of a 2-amino-8-naphthol-6-sulfonic acid compound:

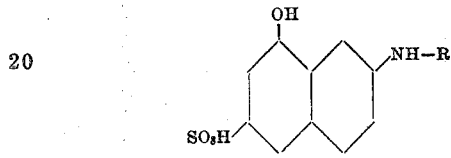

(R is hydrogen which may be replaced by a substituent *e. g.*

$-CH_3, -C_2H_5, -C_6H_5, -C_6H_4-CH_3,$ etc.) as one component and with one molecule of a beta-naphthylamin sulfonic acid compound:

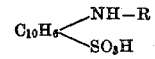

(R=H which may be replaced by an alkyl *e. g.* $-CH_3, -C_2H_5, -CH_2-C_6H_5,$ etc.) The diazotized urea compound can also be combined with two molecules of the same or of two different beta-naphthylamin sulfonic acid compounds above mentioned. The order in which the combination is carried out does not affect the result.

The new azo dyes having most probably the formula:

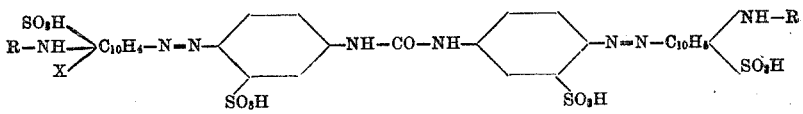

(X is hydrogen which may be replaced by OH; R is hydrogen which may be replaced by a substituent *e. g.* alkyl, aryl, etc.) are after being dried and pulverized in the shape of their alkaline salts dark powders soluble in water; yielding upon reduction with stannous chlorid and hydrochloric acid para-para'-diaminodiphenylurea-meta-meta'-disulfonic acid which is further split up into $CO_2$ and para-phenylenediamin-sulfonic acid and a diaminonaphthalene sulfonic acid compound.

In order to illustrate the new process more fully the following example is given, the parts being by weight:—The tetrazo compound obtained from 402 parts of para-para'-diaminodiphenylurea-meta meta'-disulfonic acid (see United States Letters Patent No. 687171, dated November 19, 1901) is combined with a solution of 518 parts of the sodium salt of beta-methyl-aminonaphthalene-7-sulfonic acid by cautiously adding sodium carbonate. The dye is salted out with common salt, filtered off and dried. It is after being dried and pulverized in the shape of its sodium salt a brown powder soluble in concentrated sulfuric acid with a red coloration; yielding upon reduction with stannous chlorid and hydrochloric acid 1-amino-2-methylaminonaphthalene-7-sulfonic acid and para-para'-diaminodiphenylurea-meta-meta'-disulfonic acid which is further split up into $CO_2$ and para-phenylenediamin-sulfonic acid. It dyes cotton a bluish-red fast to light.

I claim:—

1. The herein described new azo dyes obtainable from 2-amino-8-naphthol-6-sulfonic acid, sulfo acids of diaminodiphenylureas and betanaphthylaminosulfonic acids which are after being dried and pulverized in the shape of their alkaline salts dark powders soluble in water; yielding upon reduction with stannous chlorid and hydrochloric acid para-para'-diaminodiphenylurea-metameta'-disulfonic acid which is further split up into $CO_2$ and para-phenylenediaminsulfonic acid and a diaminonaphthalene sulfonic acid compound and dyeing cotton which is after being dried and pulverized in the shape of its sodium salt a brown powder soluble in concentrated sulfuric acid with a red coloration; yielding upon reduction with stannous chlorid and hydrochloric acid 1-amino-2-methylaminonaphthalene-7-sulfonic acid, para-para'-diaminodiphenylurea - meta-meta'-disulfonic acid which is further split up into $CO_2$ and para-phenylenediamin-sulfonic acid; and dyeing from red to violet-red shades fast to light, substantially as described.

2. The herein described new dyestuff having most probably the formula:

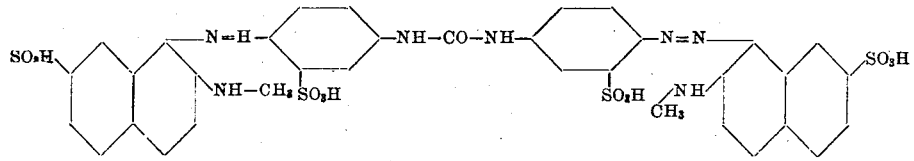

cotton a bluish-red fast to light, substantially as described.

In testimony whereof I have hereunto set my hand in the presence of two subscribing witnesses.

OSCAR GÜNTHER [L. S.]

Witnesses:
ALFRED HENKEL,
ALBERT T. NUFER.